United States Patent [19]

Marets

[11] Patent Number: 4,495,043
[45] Date of Patent: Jan. 22, 1985

[54] PROCESS FOR SUPPLYING ELECTRIC POWER TO AN OZONIZER

[75] Inventor: Maurice Marets, Sevran, France

[73] Assignee: Trailigaz, Compagnie Generale de L'Ozone, Garges les Gonesse, France

[21] Appl. No.: 240,351

[22] Filed: Mar. 4, 1981

[30] Foreign Application Priority Data

Mar. 6, 1980 [FR] France ................. 80 05012
Jan. 7, 1981 [FR] France ................. 81 00130

[51] Int. Cl.$^3$ ............................................. C01B 13/10
[52] U.S. Cl. ................................. 204/176; 315/209 R; 361/235
[58] Field of Search ............ 204/176; 422/186.15, 422/186.16; 315/209 R; 361/235

[56] References Cited

U.S. PATENT DOCUMENTS 4,016,060 4/1977 Lowther ................. 204/176
4,038,165 7/1977 Lowther ................. 204/176
4,051,045 9/1977 Yamamoto et al. ........... 250/536

Primary Examiner—John F. Niebling
Attorney, Agent, or Firm—Sughrue, Mion, Zinn, Macpeak and Seas

[57] ABSTRACT

The ozonization installation comprises a group of n ozonizers supplied with energy by a common source in a successive alternating voltage wave train mode, the application of the wave trains being controlled by a control device. The latter produces initiating signals which selectively enable the passage of the electric energy in the form of wave trains coming from the common source to the ozonizer. The installation comprises a servo system chain comprising devices for controlling the duration of the initiating signals by means of a set signal, having regard to the total ozonization produced by the n ozonizers. This duration corresponds to that of each successive wave train. Synchronization devices are provided for connecting the common energy source to solely one ozonizer at a time.

12 Claims, 16 Drawing Figures

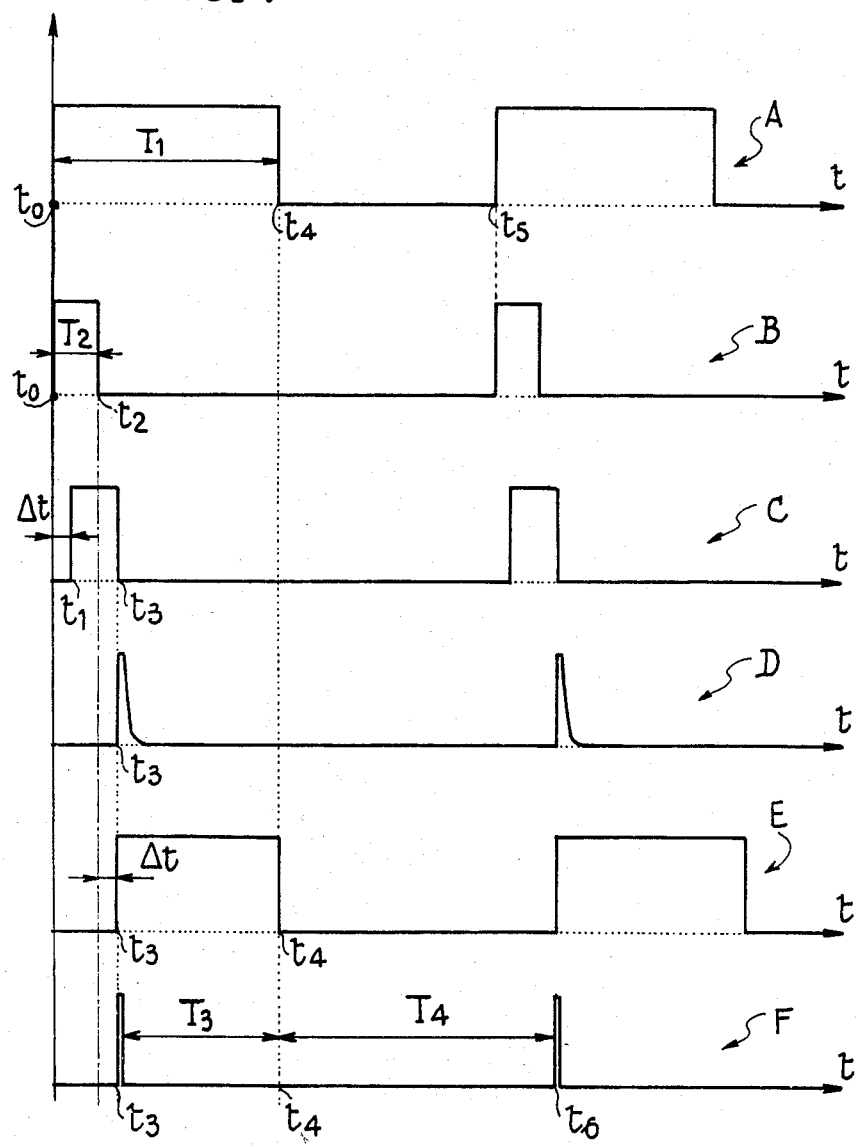

FIG._5
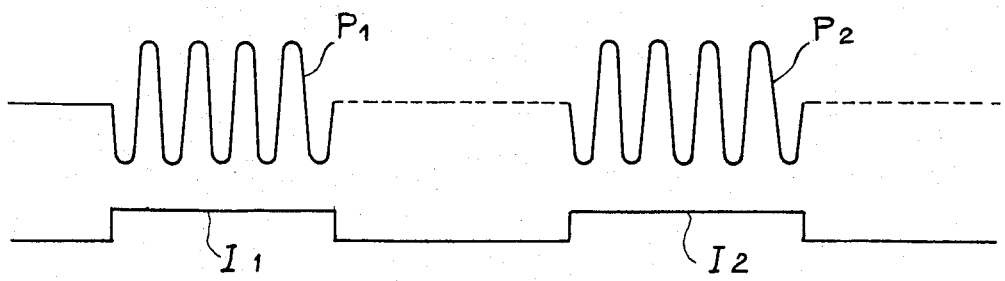
FIG._10
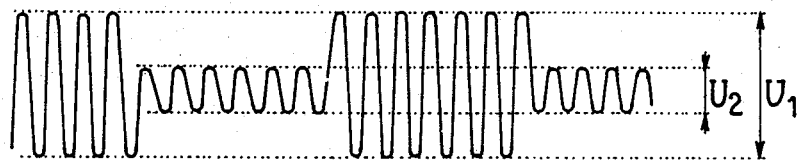
FIG._11
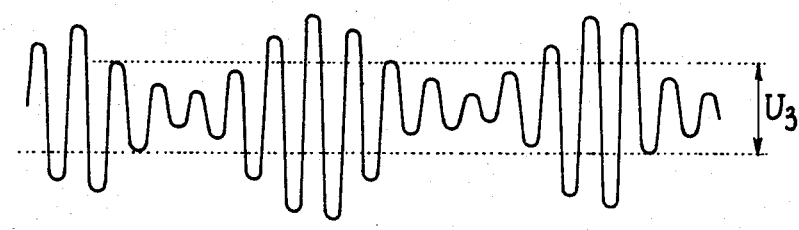

PROCESS FOR SUPPLYING ELECTRIC POWER TO AN OZONIZER

DESCRIPTION

The invention relates to a process for supplying electric power to an ozone generating element and to electric supply devices for carrying out said process.

Measurements carried out on conventional ozonizers having a dielectric show that the electric energy supplied to the ozonizer is dissipated in the following manner:

heat: 90% of the electric power supplied;
production of the ozone: 4.5%;
various chemical actions such as noise, light, losses in the dielectric: 6.5%.

This shows that conventional dielectric ozonizers have a very low efficiency which is at the present time in the neighbourhood of 18 to 19% watts/hour per gram of ozone produced at a concentration of 15 to 20 grams of ozone per cubic meter of air.

Other types of ozonizers are also known and in particular point-plane ozonizers and coaxial wire ozonizers which are supplied with direct current. These ozonizers usually have a higher efficiency than the dielectric ozonizers but with a lower concentration of ozone per cubic meter of treated gas, which is usually insufficient for industrial uses.

An object of the invention is to provide a process for supplying electric power to an ozonizer which permits, at concentrations of ozone required for industrial uses, improving the efficiency of the production of ozone which is fundamental to the development of ozonization techniques, bearing in mind the increasing cost of energy.

According to the invention, there is provided a process for supplying electric energy to at least one ozone generating element or ozonizer, comprising at least two conductive electrodes disposed in facing relation to each other and between which flows a gas to be ozonized, wherein there are applied to said electrodes wave trains of alternating voltage of an amplitude capable of producing electronic discharges between the electrodes with a frequency of repetition which is such that a volume of gas treated by a wave train has been at least partly evacuated from the space between said electrodes when the following wave train is applied.

Another object of the invention is to provide an electric supply device for an ozone generating element or ozonizer for carrying out the process defined hereinbefore, said device comprising a medium frequency wave former comprising a transformer whose secondary winding is connected to the terminals of said element and a logic device controlling the wave former for varying the amplitude of the alternating voltage produced at the terminals of said secondary winding between said value capable of producing an electronic discharge between the electrodes and a value which is insufficient to produce said discharge.

Owing to the process and device according to the invention, the electronic discharge between the electrodes is interrupted at the end of each wave train, which avoids the destruction, in accordance with the reaction: $e + O_3 \rightarrow O_2 + O^- + 10$ KC (Kilo Coulomb), of the ozone just produced.

When the following wave train is applied, at least a part of the air ozonized by the preceding wave train has already been evacuated from the space between the electrodes and is unaffected by the new discharge so that, for a given power, the supply mode employing a wave train increases the ozonization efficiency relative to a permanent alternating supply in the case of a dielectric ozonizer or to a direct voltage supply in the case of a point-plane or coaxial wire ozonizer.

In an ozonization station of a certain size, it is desirable that a common electric supply source supply energy to a plurality of ozonizers which deliver their ozone in parallel. Each ozonizer has its own wave former operating in a discontinuous mode and being alternately blocked and open, so as to supply energy to the ozonizer by means of high tension wave trains, as described hereinafter.

Such an electric supply device takes a large amount of energy during a very short period of time and then remains at rest for a certain period of time.

If a plurality of ozonizers are connected in parallel to a common source of energy and the wave formers deliver their wave trains without being adjusted with respect to one another, the wave trains at certain moments will be synchronous in groups or completely, and this in an apparently random manner.

Such an operation has drawbacks.

Firstly, in order to accommodate peak demands in energy created by the probable simultaneousness of the supply of energy to a plurality of ozonizers, the source of energy must be overdimensioned. Further, the very principle of operation is liable to be seriously disturbed, since the synchronous initiation of a plurality of wave formers may result in the collapse of the supply voltage of the wave train and this may have serious consequences in the energy efficiency owing to the impossibility of obtaining a sufficient amplitude of the wave train.

Consequently, another object of the invention is to provide an ozonization installation comprising a group of n ozonizers supplied with energy by a common source in the successive alternating voltage wave train mode, the application of the wave trains being achieved by means of a control device which produces initiating signals which selectively enable the passage of electric energy coming from the common source to the ozonizers, said installation comprising a servo system comprising means for controlling the duration of said initiating signals by a set signal bearing in mind the total ozonization produced by the n ozonizers, said duration corresponding to the duration of each successive wave train, and synchronizing means for supplying only a single ozonizer at a time with energy from said common source of energy.

Owing to these features, the following two results are obtained while acting on the characteristics of the wave trains (distribution with respect to time and duration).

1. The wave trains can in no way be initiated simultaneously; on the contrary, they are always presented in succession. Consequently, the source of energy will always been drawn upon by an energy demand of equal magnitude with respect to time and consequently it may be calculated exactly for supplying energy to a single wave train at a time.

2. The wave trains are exactly calibrated as a function of the energy demand on the part of the ozonizers, since their energy content is regulated by the servo system circuit as a function of the evolution of parameters corresponding to the effective production of ozone on one hand, and a reference value on the other.

According to a particular feature of the invention, the installation is so arranged that each ozonizer is connected to the common source of energy through its own ozonizer initiated by said initiating signal.

According to another feature, the installation comprises a common wave former connected between said common source of energy and said n ozonizers through n selecting means controlled by said initiating signals so as to enable the conditioned passage of the output of said wave former to a single one of said ozonizers at a time.

The invention will be described in more detail hereinafter with reference to the accompanying drawings which show solely by way of example two embodiments and in which:

FIG. 4 is a time diagram showing the shape of the signals at various points of the circuit shown in FIG. 3;

FIG. 5 is a diagram showing the shape of the wave trains which are applied by the wave former to the ozonizer by means of the control circuit of FIG. 3;

FIGS. 10 and 11 are diagrams similar to FIG. 5 showing the shapes of the wave trains which may be produced by the wave former of FIG. 2 by means of the control circuit of FIG. 9;

The invention will now be described as applied to an ozonizer employing a dielectric shown in FIG. 1, but it must be understood that the scope of the invention is in no way intended to be limited to this ozonizer and that it may be also applied to any other type of ozonizer whether it be of the dielectric, coaxial wire, point-plane or other ozonizer.

Figure 1:
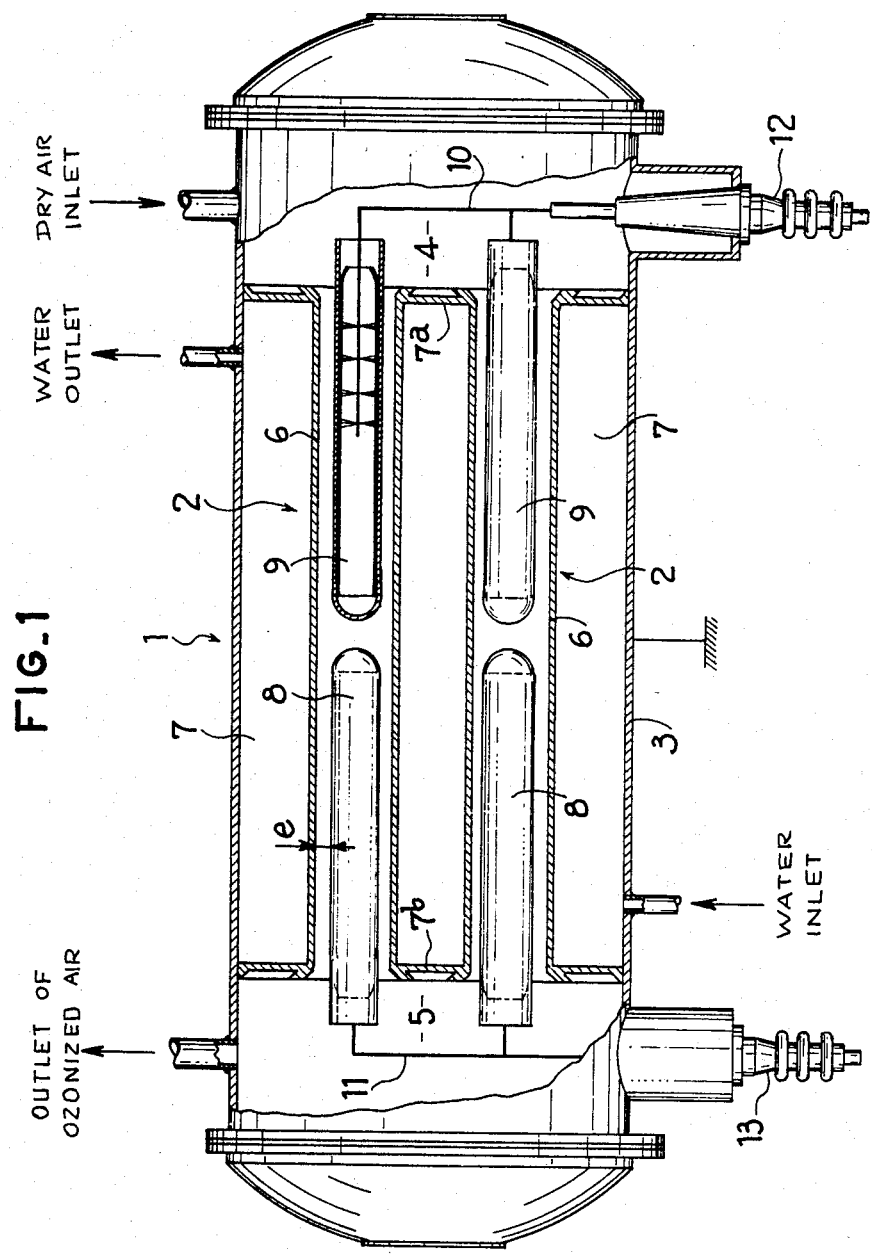
FIG. 1 is a longitudinal sectional view of a dielectric ozonizer having cylindrical electrodes of conventional type to which the invention is applied.

With reference to FIG. 1, the dielectric ozonizer 1 comprises identical ozone producing elements 2 disposed in a tubular case 3 having at its opposite ends an inlet chamber 4 for dry air to be ozonized and a chamber 5 for discharging ozonized air. The chambers 4 and 5 communicate with each other by way of cylindrical pipes 6 which extend through an enclosure 7 defined between the tubular wall of the case 3, the cylindrical pipes 6 and the end walls 7a, 7b which define with the end parts of the case 3 the chambers 4 and 5 respectively. In operation, a stream of cooling water flows through the enclosure 7.

Each ozone producing element 2 comprises in its pipe 6, which constitutes a first electrode connected to ground, a set of two cylindrical electrodes 8 and 9 coated with a dielectric material and electrically connected to a supply device, which will be described hereinafter, by electric conductors 10 and 11, through sealed connections 12 and 13 provided in the chambers 4 and 5 respectively.

In operation, the dry air to be treated which enters the chamber 4 flows to the chamber 5 through the ozone producing elements 2. The supply device applies to the electrodes 8, 9 of the elements trains of waves of alternating voltage at medium frequency and at an amplitude capable of producing an electronic discharge between the electrodes 8, 9 and their respective cylindrical pipe 6 and resulting in the ionization of the air in the space e between the electrodes. Further, these wave trains are applied with a frequency of repetition which is such that a substantial part of the air which has just been ozonized had been evacuated from the ozone producing elements 2 when the following wave train is applied, whereby a destruction of the previously-formed ozone by the new discharge is avoided.

Figure 2:
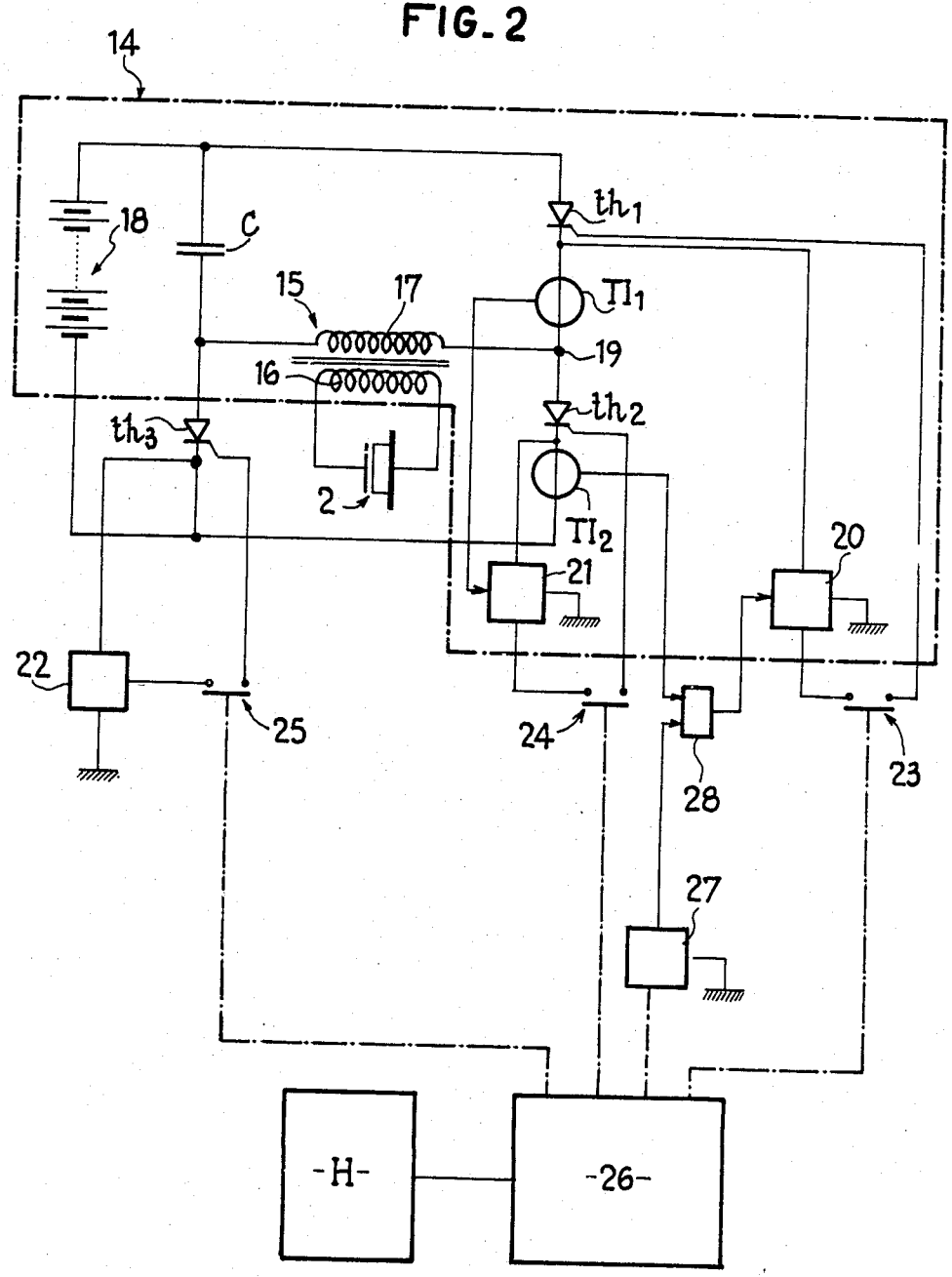
FIG. 2 is a simplified diagram of a wave former for the supply of the ozonizer of FIG. 1, associated with a control circuit of a first type.

Reference will now be made to FIG. 2 which shows a wave former or converter 14 employing thyristors and its control circuit. The wave former 14 comprises a step-up transformer 15 whose secondary winding 16 is connected to the electrodes of a ozone producing element 2 of the ozonizer 1. The primary winding 17 of the transformer is connected to a terminal of a capacitor C whose other terminal is connected to the positive terminal of a direct voltage supply source 18, this primary winding 17 being also connected at 19 between two thyristors $th_1$ and $th_2$ which are connected in series to the terminals of the supply source 18. Voltage generators 20 and 21 are disposed in the initiating circuit of the thyristors $th_1$ and $th_2$ respectively so as to render the latter conductive in response to control or command signals which are applied thereto by current transformers $TI_2$ and $TI_1$ respectively. The current transformer $TI_1$ is connected between the thyristor $th_1$ and the point 19 and the current transformer $TI_2$ is connected between the thyristor $th_2$ and the negative terminal of the supply source 18. The current transformers $TI_1$ and $TI_2$ have for function to detect the passage through zero the current in the thyristor with which they are associated and to send a command signal to the corresponding voltage generator in response to this detection. The wave former just described constitutes a self-oscillating independent wave former of conventional type.

A thyristor $th_3$ is connected by its anode between the capacitor C and the primary winding 17 of the transformer 15 and by its cathode to the negative terminal of the supply source 18. A third voltage generator 22 is connected in the initiating circuit of the thyristor $th_3$ so as to command the conduction thereof.

Normally-open analog gates 23, 24 and 25 are connected in the trigger circuits of the thyristors $th_1$, $th_2$ and $th_3$ respectively. In the present description "analog gate" is intended to embrace any electronic circuit such as, for example, a semiconductor or a semiconductor device which, in the presence of a logic level, closes so as to allow the passage of a signal while conserving the amplitude and format of this signal. Such an analog gate may be formed by a contact-free relay such as that put on the market under the name "SEREN-DIP" by the United States firm "TELEDYNE".

The analog gates 23, 24 and 25 are controlled by a logic device 26 associated with a time base generator H which determines the frequency of repetition of the wave trains. The logic device 26 also controls a logic initiating circuit 27 whose output is applied to the input of an OR gate 28. The other input of the OR gate 28 receives the control signals of the current transformer $TI_2$ which, as distinguished from the current transformer $TI_1$, is consequently not directly connected to its associated initiating voltage generator 20. The output of the OR gate 28 is connected to the voltage generator 20 in such manner that the latter applies a voltage to the gate of the thyristor $th_1$ only if a suitable logic level is present at at least one of the inputs of the OR gate 28.

The circuit shown in FIG. 2 operates in the following manner:

On the rising edge of the time base signal A (FIG. 4), the logic control device 26 closes the analog gates 23 and 24 for enabling the application of control voltages to the gates of the thyristors $th_1$ and $th_2$, the latter being then blocked, and the analog gate 25, so that the voltage generator 22 applies to the gate of the thyristor $th_3$ a voltage which renders the latter conductive and charges the capacitor C. After a predetermined period of time corresponding to the charging time of the capacitor 20, the thyristor $th_3$ is blocked since its maintaining current has become too low and the logic device 26 opens the analog gate 25. After a short safety time, the logic device 26 actuates the initiating logic circuit 27 which in response applies an initiating pulse to the OR gate 28. The output of the latter changes from a logic "0" level to a "1" level and this causes the generator 20 to apply a voltage to the gate of the thyristor $th_1$, rendering the latter conductive. The capacitor C is then discharged through the self-induction coil of the primary winding 17 of the transformer 15 through the thyristor $th_1$ which causes a first alternation to appear at the terminals of the secondary winding 16 and a transfer of energy to the ozonizer 1. When the current in the discharge circuit of the capacitor C becomes null, the thyristor $th_1$ is blocked and the current transformer $TI_1$, in response to this nullification of the current, actuates the voltage generator 21 which renders the thyristor $th_2$ conductive. The capacitor C is then charged through the primary winding 17 of the transformer 15 and the thyristor $th_2$ so that an alternation of polarity opposed to the preceding one is produced at the terminals of the secondary winding 16 and the energy is again transferred to the ozonizer 1. Upon the nullification of the current in the charging circuit of the capacitor C, the thyristor $th_2$ is blocked and the thyristor $th_1$ is rendered conductive by the current transformer $TI_2$ and the voltage generator 20. A new charging cycle of the capacitor C then starts and the procedure is repeated in the manner just described until there appears the descending edge of the time base signal A. At this descending edge, the logic device 26 opens the analog gates 23 and 24, which block the thyristors $th_1$ and $th_2$ and interrupts the operation of the wave former. The ozonizer is no longer supplied with energy until there appears a new rising edge of the time base signal A which once again initiates the procedure of the operation of the wave former, namely the charging of the capacitor C and the application of a new wave train to the ozonizer 1 as shown in FIG. 5.

Figure 3:
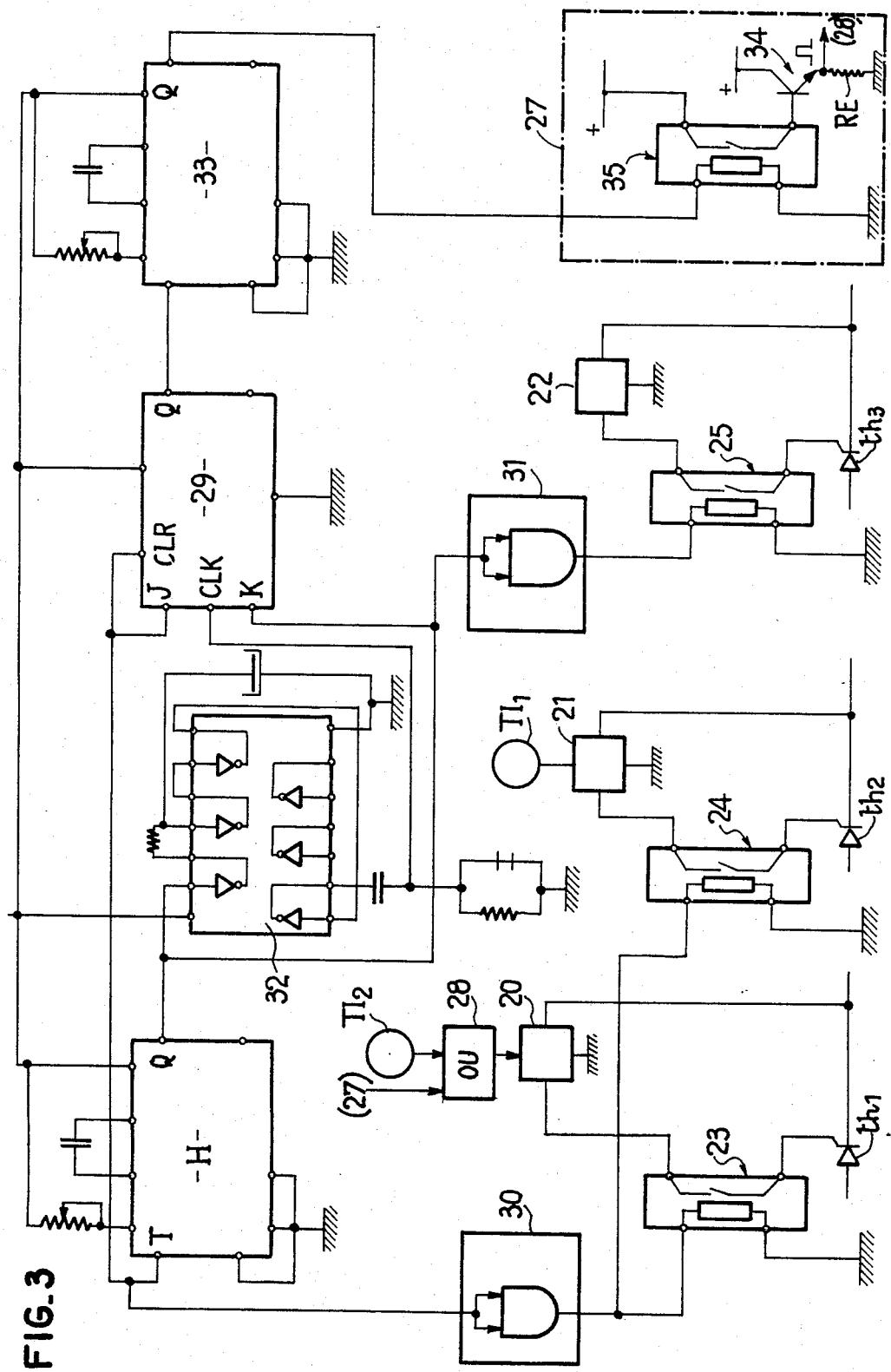
FIG. 3 is a more detailed diagram of a first embodiment of the control circuit of FIG. 2.

Reference will now be made to FIG. 3, which illustrates an embodiment of the circuit controlling the wave former 14 of FIG. 2. In this embodiment, the time base generator H is a monostable circuit which may be for example an integrated circuit of the type S.N. 74 121 of the firm Texas Instruments. The monostable circuit H produces at T the time base signal A whose frequency determines the frequency of repetition of the wave trains of the wave former 14. The signal A is applied, on one hand, to the inputs J and CLR of a JK flipflop formed for example by an integrated circuit 74 73 (Texas Instruments) and, on the other hand, to the analog gates 23 and 24 through an AND gate 30. The monostable circuit also produces at its output Q a signal B (FIG. 4) at the same frequency as the signal A but whose pulse duration is shorter and determines the charging time of the capacitor C. This signal B is applied to the analog gate 25 through a second AND gate 31, to an inverter 32, constituted for example by an integrated circuit 7404 (Texas Instruments), and to the input K of the JK flipflop 29.

The inverter 32 produces, in response to the application of the signal B, a signal C identical to the signal B but slightly offset with respect to time relative to the latter by a delay $\Delta t$, and, from the signal C, a signal D which is applied to the CLK input of the flipflop 29. The flipflop 29 produces at its output Q a signal E which is applied to a second monostable circuit 33. The monostable circuit 33 produces at its output Q a signal F formed by one or more calibrated pulses applied to the initiating logic circuit 27. As illustrated, this initiating circuit 27 may comprise a transistor 34 having an emitter load RE, and an analog gate 35 disposed in the base circuit of the transistor 34.

At the time $t_0$ (FIG. 4) at the front edge of a rectangular pulse of duration $T_1$ of the signal A produced by the monostable circuit H, the analog gates 23 and 24 are closed while a "1" level is applied to the inputs J and CLR of the JK flipflop 29. Also at time $t_0$ the output Q of the monostable circuit H produces a rectangular pulse of duration $T_2$ which closes the analog gate 25 and renders the thyristor $th_3$ conductive and thus enables the capacitor C to be charged during the time $t_2$. In response to the application of the rectangular pulse of the signal B, the inverter 32 in turn produces at time $t_1$, with the delay $\Delta t$ with respect to $t_0$, a rectangular pulse (signal C). At time $t_2$, the capacitor C has finished charging itself and the signal B returns to the "0" level so that the analog gate 28 opens.

The wave former is then ready to operate.

At time $t_3$, the signal C returns to the "0" level and the signal D changes to the "1" level, which changes the condition of the JK flipflop and produces at its output Q a "1" level. In response to this change of state, the second monostable circuit 33 in turn produces, substantially at time $t_3$, an initiating pulse of short duration, for example of the order of 100 ms, which actuates the initiating circuit 27. The latter then closes the analog gate 35 which renders the transistor 34 conductive. The latter applies a pulse to the OR gate 28 which then actuates the voltage generator 20 which renders the thyristor $th_1$ conductive and starts the operation of the wave former 14. Note that the initiating pulse (signal F, FIG. 4) is applied with the delay $\Delta t$ with respect to the time $t_2$, this delay corresponding to a safety stoppage time.

The operation of the wave former proceeds as previously indicated until the time $t_4$ is reached, when at the rear edge of the rectangular pulse, the time base signal A returns to the "0" level. This has for effect to open the analog gates 23 and 24 and to block the thyristors $th_1$ and $th_2$. Simultaneously, the passage to the "0" level of the signal A puts the JK flipflop 29 back into the "0" state. Consequently, a wave train has been produced by the wave former and applied to the ozonizer between the instants $t_3$ and $t_4$ during a period $T_3$. The wave former then remains at rest during a period $T_4$, until, after a new rectangular pulse of the time base signal A appears at $t_5$, a new cycle of operation of the wave former is initiated at time $t_6$.

It is clear from the foregoing that the wave former 14 operates as a self-oscillating independent wave former, the alternating wave produced thereby being artificially interrupted and then again initiated after a time of rest $T_4$ of a predetermined duration. The introduction of a synchronus interruption/starting logic (JK flipflop 29) does not modify the basic operation of the wave former 14.

Of course, the foregoing detailed sequences of operation may be achieved by logic means other than those described hereinbefore, for example with the use of integrated circuits of the DTL, TTL or CMOS type. It is furthermore possible to employ a microprocessor associated with a time base generator and with a memory system, as will be described hereinafter.

This microprocessor and memory system permits the direct creation of signals pertaining to the actuation of the thyristors $th_1$, $th_2$ and $th_3$ in accordance with sequences identical to those previously described in respect of the hardware logic embodiment. However, the use of the microprocessor also permits the very simple introduction of a regulation function.

This regulation function may, for example, consist in that the energy absorbed by the ozonizer is modulated, while conserving the wave trains of constant duration, and that there are provided a variable and controlled number of the latter during a basic duration $\tau_1$ which may be, for example, one second. If the nominal power of the ozonizer is obtained for example for 100 wave trains per second, 30% of the ozonization power will be obtained by providing only 30 wave trains during one second. Of course, the procedure is preferably so arranged that the distance between each wave train is regular within each basic duration $\tau_1$ so as to achieve good linearity of the regulation mode.

Bearing in mind the fact that the power of the ozonizer and the production of ozone varies linearly as a function of the peak voltage applied to the ozonizer, the transfer function of the ozonizer within the framework of the Laplace conversion is $$\frac{1}{1 + \tau_2 P}$$

i.e. an expression of the first order in which:
P is the Laplace operator
$r_2$ is the time constant of the ozonizer $1 \leq \tau_2 \leq 5$ seconds.

Apart from the advantage of the linearity, this mode of regulation permits, with decreasing power, to approach minimal conditions of destruction of the ozone since, for a given flow of air, if the interval between the consecutive wave trains increases, an increased volume of ozonized air is discharged during this interval.

In the embodiment described hereinafter with reference to FIG. 6, the regulation is effected in accordance with two parameters, namely:

a power/ozone production reference formed by an exterior analog signal applied to the microprocessor and proportional to the desired production of ozone, and the previously-defined base duration $\tau_1$ which is contained in the microprocessor.

The role of the microprocessor in its regulation function is to ensure that the number of wave trains, in the base duration $\tau_1$, corresponds to a power or a production of ozone equal to the electrical power/ozone production reference.

Figure 6:
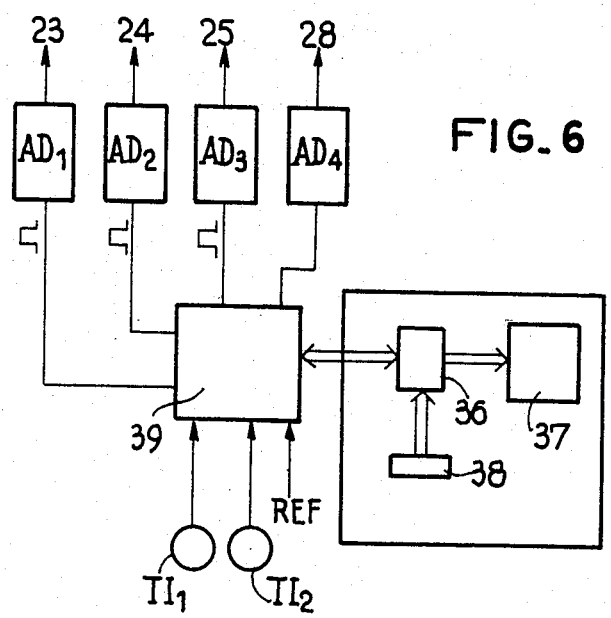
FIG. 6 is a block diagram of a second embodiment, of the control circuit of FIG. 2 having a microprocessor.

FIG. 6 represents a microprocessor system which may be employed for forming the control device 26 and the time base generator H. This system comprises a microprocessor 36 associated with a memory unit 37 and a local clock 38 which may be, for example, formed by the components 8080,2708 and 8224 of the firm INTEL. The microprocessor is coupled to an input and output system 39 which receives the signals from the current transformers $TI_1$ and $TI_2$ and the electrical power/ozone production reference signal REF. The input-output system 39 is moreover connected to adaptor circuits $AD_1$, $AD_2$, $AD_3$, $AD_4$ which respectively act on the analog gates 23, 24, 25 and the OR gate 28, the initiating logic circuit 27 being replaced in this case by the adaptor circuit $AD_4$.

Figure 7:
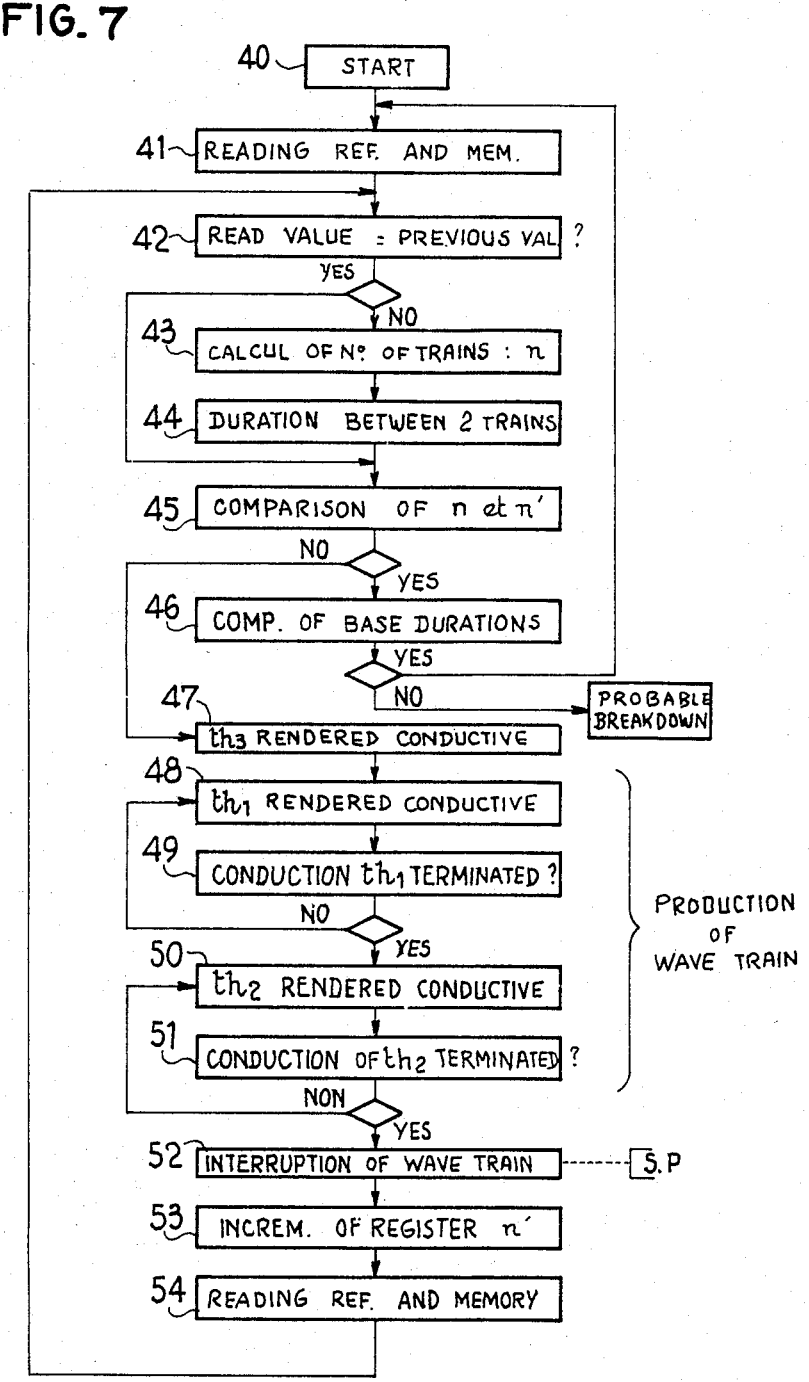
FIG. 7 is a flow chart illustrating the operation of the microprocessor control circuit of FIG. 6.

The regulation procedure ensured by the microprocessor system of FIG. 6 is illustrated by the flow chart of FIG. 7 and proceeds in the following manner.

After the starting stage of the procedure (stage 40), the microprocessor reads the power ozone production reference and stores the latter (stage 41) then compares the value and the previous value (stage 42). If these values are different, the microprocessor calculates the number n of wave trains required in the base duration from the power/ozone production reference (stage 43) and stores it. The microprocessor then calculates the duration between two wave trains and stores it (stage 44).

After stage 44, the microprocessor compares the number n' of wave trains already produced during the current base duration and compares it with n (stage 45). Further, if at stage 42 the read value is equal to the previous value, the microprocessor passes directly to stage 45.

If at stage 45 an equality between n and n' is found, this signifies that there is equality between the power delivered and the power demanded. The microprocessor then passes to stage 46 where the base duration effectively produced is compared with the theoretical base duration. If these base durations are equal, the procedure returns to stage 41. On the other hand, if a difference exceeding a certain threshold value is found, the microprocessor delivers a "probable breakdown" signal.

If it is found at stage 45 than n and n' are not equal, the microprocessor renders the thyristor $th_3$ conductive so as to charge the capacitor 20 (stage 47) then, after a delay corresponding to the charging time of the capacitor 20 and to the safety stoppage time, the microprocessor renders the thyristor $th_1$ conductive so as to initiate the operation of the wave former (stage 48).

The microprocessor then determines if the conduction of the thyristor $th_1$ is terminated by reading the current transformer $TI_1$. In the negative, the procedure returns to stage 48. In the affirmative, the microprocessor renders the thyristor $th_2$ conductive by applying a pulse train thereto, as to the thyristor $th_1$ (stage 50).

As before for the thyristor $th_1$, after the stage 50, the microprocessor determines whether the conduction of the thyristor $th_2$ is terminated (stage 51). In the negative, the procedure returns to stage 50, whereas, in the affirmative, the microprocessor interrupts the wave train produced by the stages 48 to 51 for the duration calculated and stored at stage 44 (stage 52). The ozonizer is then no longer supplied with energy.

At the following stage 53, the microprocessor increments a register containing the number n' of wave trains already effected in the base duration then reads and stores the power ozone production reference (stage 54) before returning to stage 42 whence the procedure proceeds as described hereinbefore.

In this regulation procedure by means of a microprocessor, the duration of the wave trains is constant, as mentioned before. However, by way of a modification, the regulation may be effected by varying the duration of the wave trains within each basic duration $\tau_1$.

Figure 8:
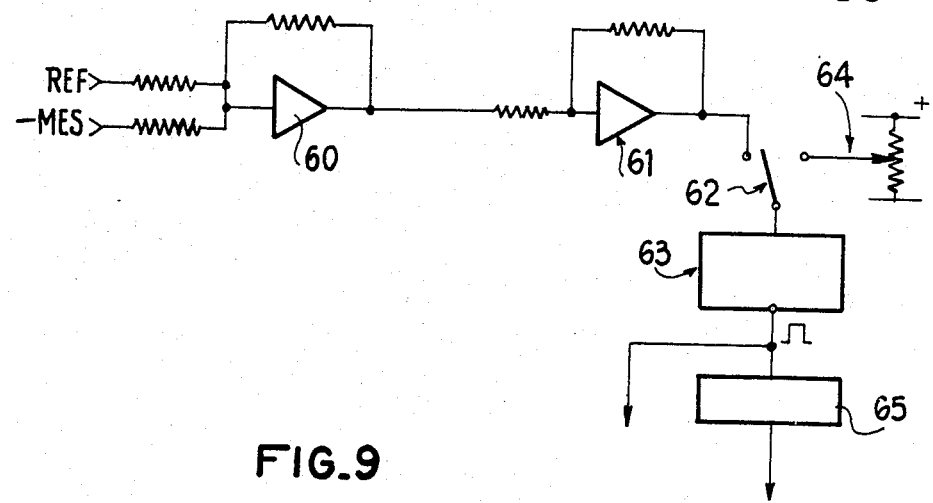
FIG. 8 is an electric diagram of a circuit generating pulses of variable durations adapted to be combined with the circuit of FIG. 3.

FIG. 8 is a diagram of a circuit which, in association with the control circuit of FIG. 3, ensures such a regulation. This circuit comprises an operational amplifier 60 to which are applied respectively the power/ozone production reference REF and an inverted signal MES representing the measured ozone production. This signal may be produced for example by the device measuring the ozonization power of an ozonizer described in French patent application No. 2,426,644 granted to the Assignee of the present application on May 10, 1982. The operational amplifier 60 produces at its output an analog signal $\epsilon G$ proportional to the difference between the signals REF and MES and which, after inversion in the inverter 61, may be applied through a switch 62 to an analog signal converter 62 converting an analog signal into a pulse length. This switch 62 is also connected to a potentiometer 64 which permits, depending on the position of the switch, either controlling the production of ozone by the reference value represented by the signal REF or manually controlling the production of ozone by means of the potentiometer 64.

The output signal of the converter 63 constitutes the time base signal A and a monostable circuit 65 is provided for producing the signal B of FIG. 4. The circuit of FIG. 8 is therefore substituted in this embodiment for the monostable circuit H of the circuit of FIG. 3 which moreover is not subjected to other modifications. The signals A and B are applied to the other components of the circuit and the latter operates as indicated before, except that the duration of the wave trains is not constant but depends on the desired production of ozone.

In all the embodiments described hereinbefore, the wave trains producing an electronic discharge alternate with periods of rest during which the wave former does not produce wave trains and consequently the voltage applied to the electrodes of the ozone producing elements is zero. However, by way of a modification, the wave former may be so controlled as to operate permanently at medium frequency but by varying its direct supply voltage in such manner as to cause the electronic discharge-producing wave trains to alternate with other wave trains whose amplitude value is insufficient to produce an electronic discharge in the ozone producing element to which the wave former is connected.

Figure 9:
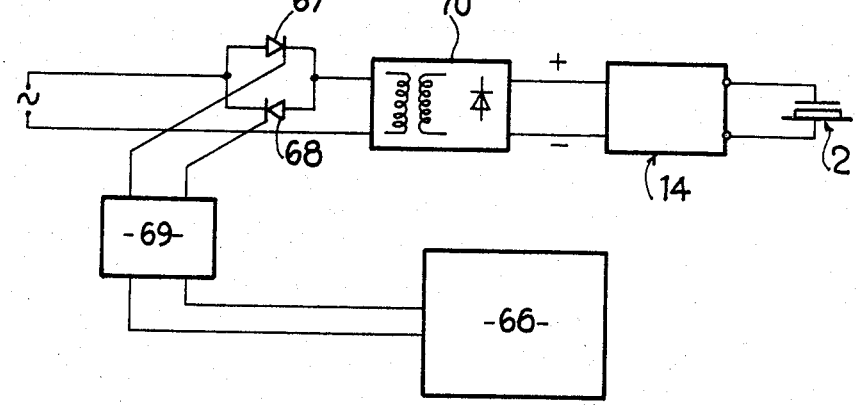
FIG. 9 is a simplified diagram of a second type of control circuit for the wave former of FIG. 2.

FIG. 9 illustrates an embodiment of a circuit for carrying out this control procedure. This circuit comprises a microprocessor 66 which determines the law of variation of the direct voltage applied to the wave former 14. It may concern an invariable law contained in a memory system of the microprocessor or a law which varies as a function of an exterior reference signal, as in the case of the control circuit of FIG. 6. The numerical signal representing this law produced by the microprocessor 66 actuates two thyristors 67 and 68 connected in reverse manner through a circuit 69 which converts the numerical signal of the microprocessor 66 into voltages controlling the thyristors 67 and 68 so that the latter modulate the electric energy of the mains supply into pulses whose width varies as a function of the law imposed by the microprocessor. The mains supply voltage converted into pulses by the thyristors 67 and 68 is applied to a transformer-rectifier circuit 70 which produces at its output a direct voltage whose magnitude varies in accordance with the aforementioned law. This direct voltage is applied to the wave former 14 in which, of course, the current transformer $TI_2$ is here connected directly to the voltage generator 20, the OR gate 28 and the analog gates 23 and 24 having been eliminated. The wave former 14 thus permanently applies to the ozone producing element 2 to which it is connected an alternating voltage having medium frequency of variable amplitude whose envelope corresponds to the shape of the direct voltage applied to the wave former.

FIGS. 10 and 11 illustrate two waveforms which may be applied to an ozone producing element by means of the circuit shown in FIG. 9. In the example of FIG. 10, the voltage suddenly varies between a high voltage $U_1$ capable of producing an electronic discharge in the ozone producing element and a lower voltage $U_2$ which is insufficient to produce this electronic discharge. In the example of FIG. 11, the peak-to-peak amplitude of the alternating voltage varies progressively on each side of a threshold $U_3$ above which electronic discharges are produced in the ozone producing element 2 and below which these discharges are absent. It must be understood that the scope of the invention is in no way intended to be limited to the two wave forms shown in FIGS. 10 and 11, since the latter have been given merely by may of examples.

It has been mentioned before that it is desirable to supply the ozonizer with wave trains of medium frequency. In order to explain this choice, in the case of a conventional dielectric ozonizer, it will be recalled that the electric discharge in an ozonizer of this type is comparable to a point-plane discharge. Indeed, owing to the microprojections of the dielectric, the discharges usually issue from well-localized sites which are always the same. Now, the intensity of the discharge issuing from a site on the dielectric is proportional to the production of ozone and the intensity absorbed by the ozonizer is the sum of all the intensities of the microdischarges. For a constant supply voltage and a given power factor, there is substantially proportionality between the power and the production of ozone.

Further, Manley's formula relates in a conventional dielectric ozonizer the power absorbed to the different electrical parameters characterizing the ozonizer, namely:

$$W = 4F \cdot C_d \cdot E_o \left[ U_m - \left( \frac{C_e}{C_d} + 1 \right) E_o \right]$$

in which
$C_d$ is the capacity of the glass dielectric
W is the power emitted by the electrode
F is the frequency of the source of energy
$E_o$ is the initiating voltage which is a function of several parameters
$U_m$ is the peak voltage
$C_e$ is the capacity of the air dielectric.

If all the parameters except the frequency are constant, the energy absorbed by the ozonization tube is theoretically proportional to the frequency. It is consequently desirable to supply the energy to the ozonizer at sufficient frequency to absorb such power that the ozonizer produces the required amount of ozone. This amounts to multiplying the number of point discharges per tube and per second. The produciton of ozone will therefore be favoured by the increase in frequency, which leads to supplying energy to the ozonizer at a frequency higher than the frequency of the mains supply (50 Hz).

Another reason which leads to increasing the frequency is to limit the action of the opposing field created by the charges electrifying the surface of the dielectric. Indeed, the higher the frequency, the more rapidly they are eliminated and less the opposing field they create decreases the action of the electric supply field. This electrification decreases the discharge current and consequently the productivity of ozone.

However, the increase in the frequency is limited by the possibilities offered at the present time by power thyristors operating at medium frequency.

These various considerations lead to a choice of an operating frequency of the order of 2,000 to 5,000 Hz and preferably about 2,000 Hz, bearing in mind the present technology of thyristors. However, these values must in no way be considered to be limitative since:

the requirements of the tuning of the primary and secondary circuits of the transformer imposes, in accordance with the number of ozone producing elements in parallel and the values of the self-inductance L of the primary and secondary windings, a certain dispersion of the frequency of resonance;

progress achieved in the technology of thyristors may lead to a choice of higher frequencies in the future.

As concerns now the choice of the power per ozone generating tube or element, it is clear that the curve $W = F(E_o)$ in which F represents Manley's formula, has a maximum for $$U_m = 2 E_o \left( 1 + \frac{C_e}{C_d} \right)$$

which relation is derived from Manley's formula.

In the neighbourhood of maximum power, the ozonization power has maximum stability. It is therefore very desirable to supply power to the ozonizer with such peak voltage $U_m$ that the preceding relation is satisfied and consequently to operate at maximum power.

This shown that the conventional dielectric ozonizer would absorb much energy if it were supplied in a permanent sinusoidal mode at medium frequency and in respecting the aforementioned relation. An advantage of the type of supply by means of wave trains is that the nominal power may be very high and the mean number of joules per second may not exceed a value guaranteeing a reasonable heating of the ozonizer, bearing in mind its characteristics and the capacity of its cooling system.

Of course, in order to prevent the destruction of the ozone already formed according to the relation:

$$e + O_3 \rightarrow O_2 + O^- + 10KC,$$

the ideal situation would be that a given volume v of air or oxygen to be treated would be treated only once, i.e. that the following wave train appear only when the preceding volume v has been evacuated. This would imply that all the energy be applied to the gas volume v during the time of a single wave train during each base duration $\tau_1$ and that the time between two wave trains correspond to the evacuation time.

Bearing in mind the present technology of dielectric ozonizers such a relation is unfortunately difficult to achieve. Indeed, for example, in respect of an ozone producing element supplying 1 liter/second, it would be necessary to apply 900 J/second for a very short period of time with a periodicity of 1 second. The power would be very higher and the thyristors of the wave former would have to be overdimensioned in considerable proportions, which results in a compromise solution.

With reference again to FIG. 5, it can be seen that the ozonizer receives a discontinuous voltage formed by a plurality of groups P1, P2 ... each formed by a plurality of alternations produced by a wave forming device. The amplitude of these groups of alternations may be of the order of a few Kw and the frequency may be for example 2,000 Hz.

The wave trains P1, P2 ... are initiated by a series of initiating pulses 11, 12 ... produced by a control device for example of the type described hereinbefore.

Figure 12:
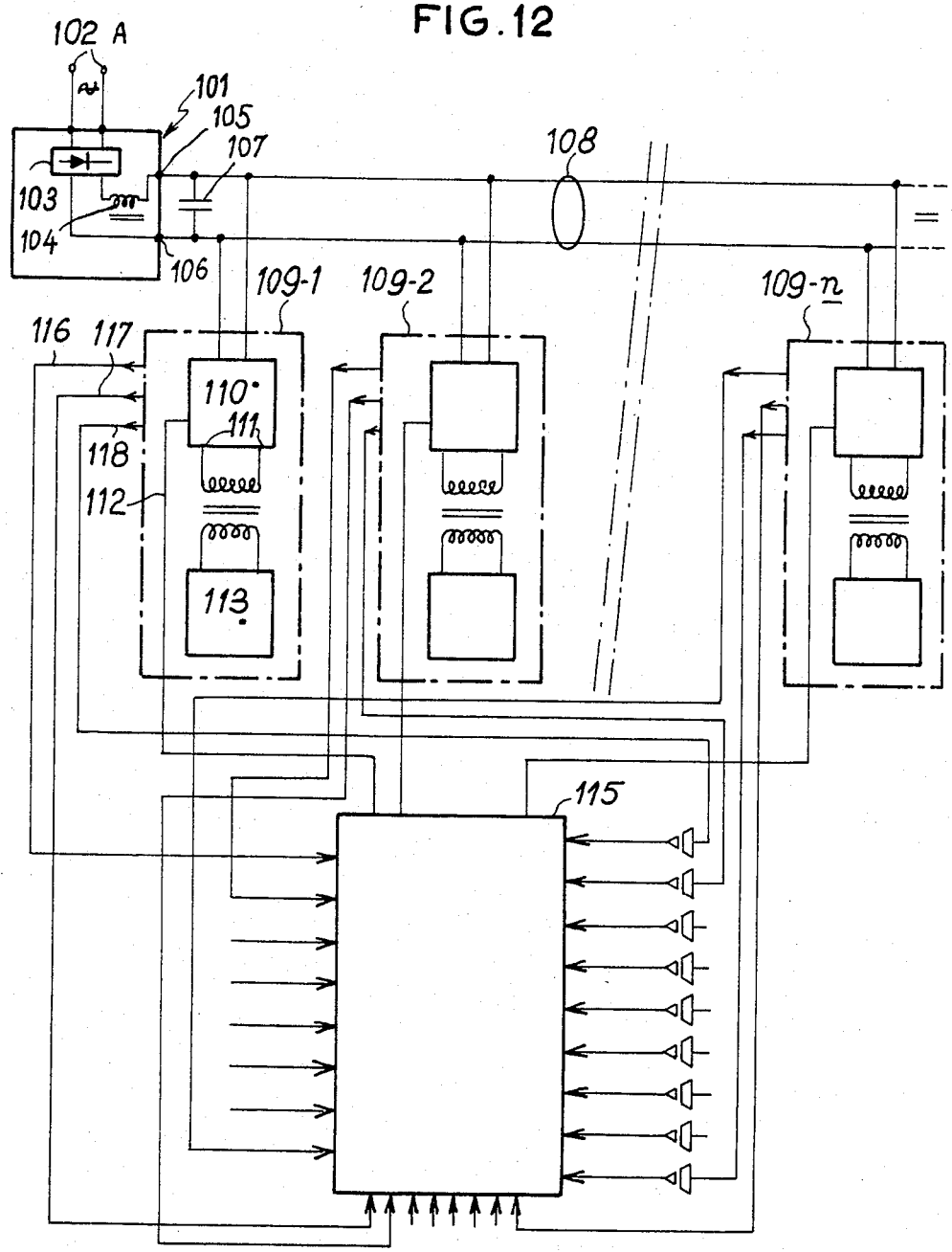
FIG. 12 is a simplified diagram of an ozonization installation supplying a plurality of ozonizers at a time.

The installation shown in FIG. 12 comprises a common source of energy 101 supplied with energy by the mains supply 102, for example, and comprising a rectifier circuit 103 and a smoothing self-induction coil 104 so as to deliver at its output terminals 105 and 106 a direct voltage filtered by a battery of capacitors 107. The terminals 105 and 106 are connected to a distribution line 108 to which are connected in parallel n ozonization units 109-1 to 109-n, the described and illustrated installation comprising by way of example eight ozonization units.

Each of these units comprises a wave former or converter 110 adapted to convert the direct voltage of the line 108 into a voltge formed by a wave train each group P1, P2 ... of which comprises a few alternations as shown in FIG. 5. This wave train appears at the terminals 111 of the wave former on condition that an initiating signal is applied to the latter through a line 112. The wave train is converted up to a high tension of a few kW for application to an ozonizer 113 of the type described hereinbefore.

All the ozonization units 109-1 to 109-n are controlled by a servo system chain 115 which is adapted to deliver initating signals applied to the lines 112 in such manner that the energy demand on the line 108 can only come from a single wave former 110 at a time.

The servo system chain is connected to each unit 109-1 to 109-n by three lines 116, 117 and 118 respectively along which the following signals travel:

On the line 116: a state signal expressing the account rendered of the effective operation of the associated unit 109-1 to 109-n. This signal is in fact an image of the electric power absorbed by the ozonization unit in question.

On the line 117: an on-off state signal indicating that the ozonization unit associated with the line is in operation or not.

On the line 118: a parameter representing the production of ozone delivered by an associated ozonization unit. On the lines 118 consequently travel the signals representing the instantaneous production of ozone.

The servo system chain 115 thus permits not only ensuring a correct synchronization of the signals applied by the lines 112 to the wave formers 110 in such manner that two wave formers can in no way be operated at a time, but also ensuring a regulation of the ozonization power by acting on the width of the initiating signals. In other words, this servo chain permits regulating the width of the pulses 11, 12 . . . shown in FIG. 5.

Figure 13:
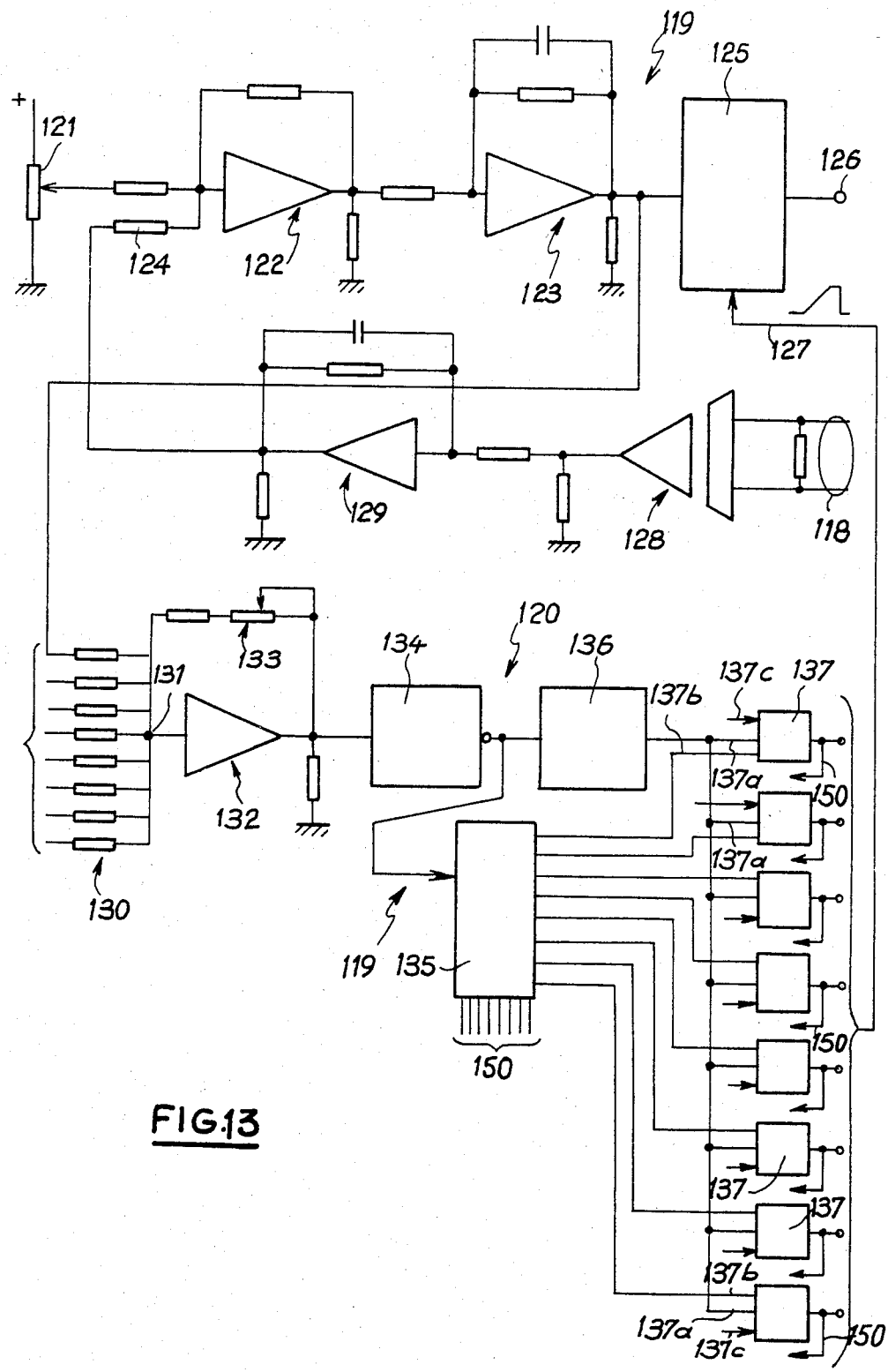
FIG. 13 is a diagram of the servo system employed in the ozonization installation of FIG. 12.
Figure 14:
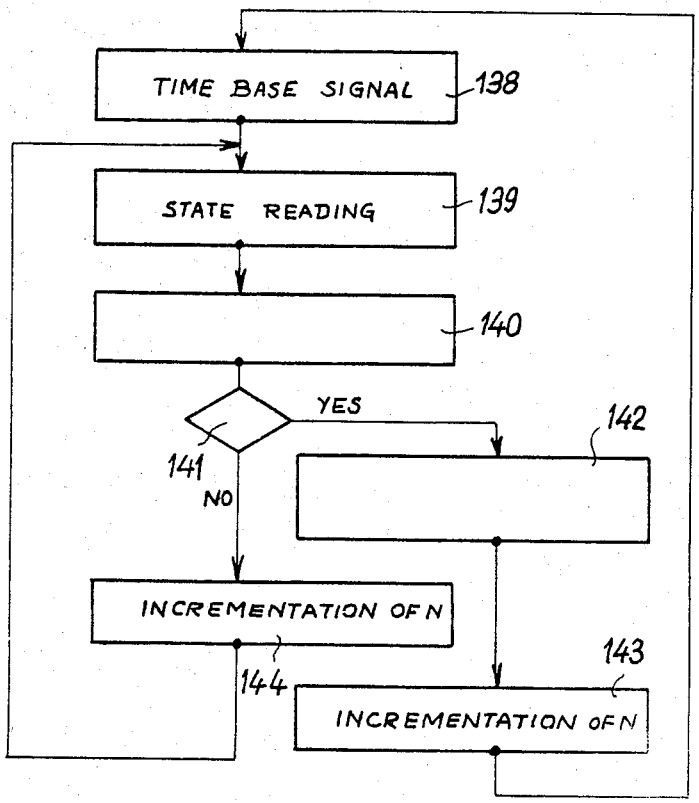
FIG. 14 is a block diagram illustrating the operation of the servo system of FIG. 13.
Figure 15:
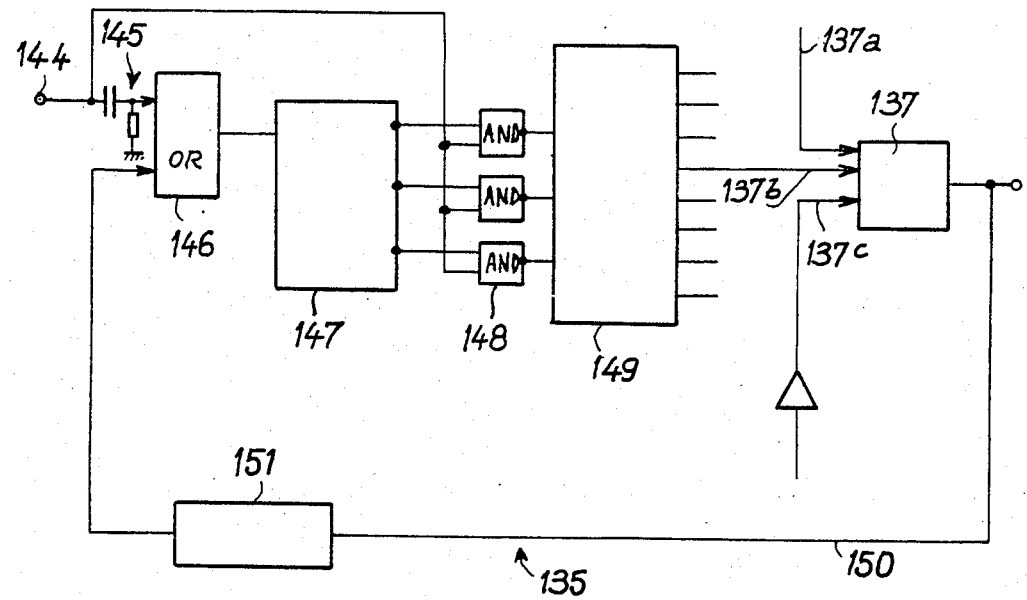
FIG. 15 is a more detailed diagram of a circuit ensuring that the group of ozonizers shown in FIG. 12 are controlled in a synchronous manner.
Figure 16:
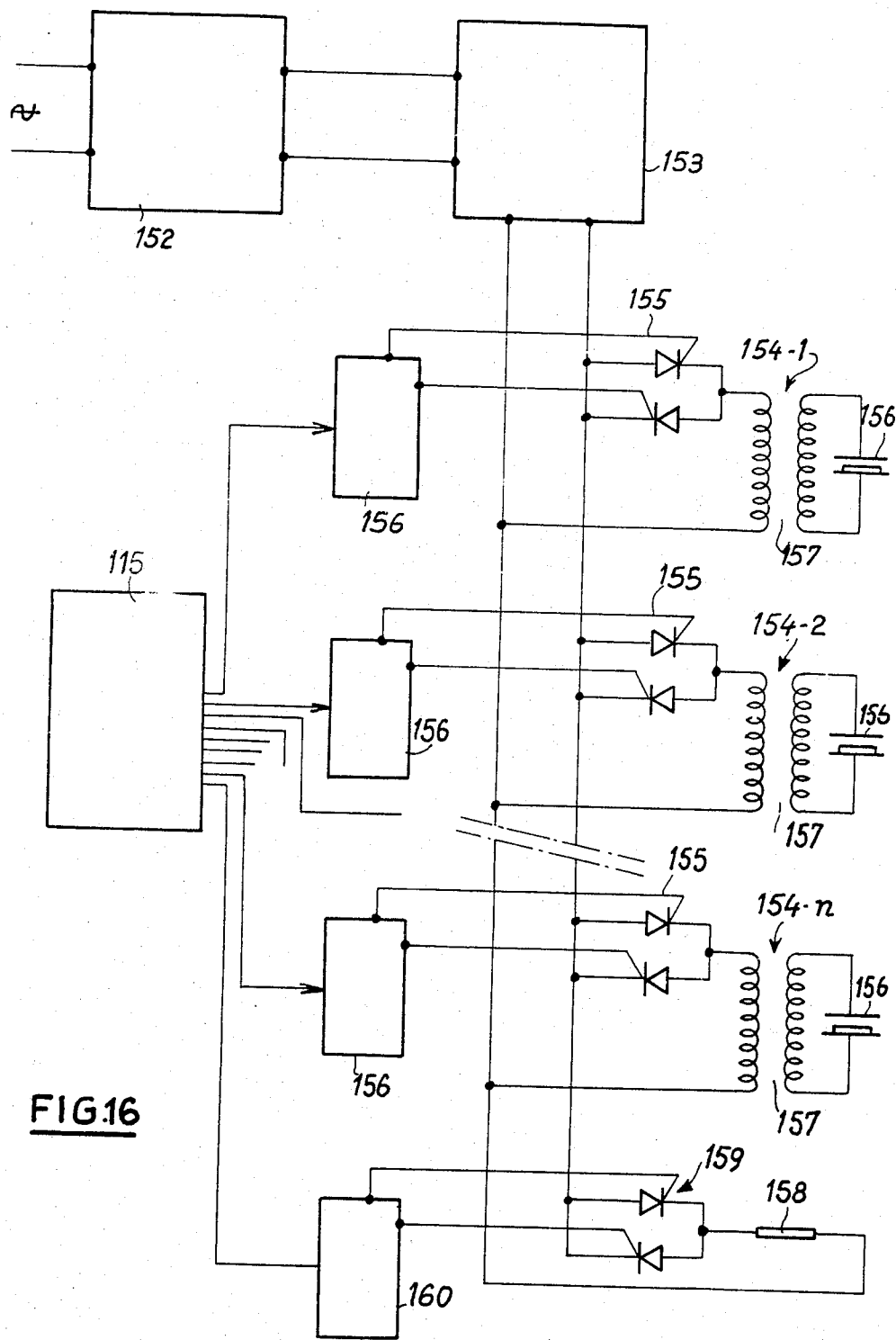
FIG. 16 shows an ozonization installation according to a second embodiment of the invention.

There will now be described a first embodiment of the servo system in which the latter is constructed in the form of hardware of essentially analog type. It will be seen hereinafter that the servo system 115 may also be constructed by means of a microprocessor ensuring the same functions as the hardware circuit of FIG. 13.

This servo system chain comprises n regulating loops 119, only the loop associated with the ozonization unit 109-1 being shown. The chain also comprises a synchronization device 120 which is common to all the ozonization units 109-1 to 109-n shown in FIG. 12.

The regulating loop 109 (FIG. 13) comprises a reference source of voltage 121 formed by an adjustable potentiometer. The slide of the latter is connected to the input of a comparator 122 comprising a direct amplifier. The output of this comparator 122 is connected to an integration circuit 123 to which the error signal of the regulating loop is applied, this signal being delivered by the comparator 122 from the reference signal (source 121) and a negative feedback signal which is also applied to this comparator through a resistor 124.

The output of the integrator 123 is connected, on one hand, to a converter 125 which produces from the output signal of the integrator 123 a signal which is pulse width modulated, this signal appearing at an output terminal 126. It is this signal which controls the wave former 110 of the ozonization unit to which the considered regulating loop 119 is connected. The conversion effected in the converter 125 is carried out by means of a sawtooth signal which is applied thereto through a line 127 by the synchronization circuit 120 which will be described hereinafter.

The instantaneous ionization signal of each loop is applied to the latter through the respective line 118, namely through an isolation amplifier 128 whose output is re-injected into the regulating loop 119 through an integration circuit 129 comprising an operational amplifier whose effect on the regulating loop is differential. Thus it can be seen that the regulating loop 119 ensures the regulation known to those skilled in the art of the type PID (proportional-integral-derivative) of the signals which it is to treat.

The synchronization circuit 120 comprises n input resistors 130 which are respectively connected to the outputs of the amplifiers 123 of the n regulation loops 119 of the servo system chain. They are together connected at a summing point 131 of an adder 132 comprising an operational amplifier between the output and input of which a regulating resistor 133 is connected. The output of the adder 132 is connected to a voltage/frequency converter 134 in which the signal from the adder 132 is converted into a series of pulses calibrated in width, the frequency of which is divided suitably so as to adapt the signal to the following circuits. Thus the output of the converter 134 is connected, on one hand, to a circuit 135 for putting into sequence and, on the other hand, to a sawtooth generator 136 of known type which comprises a high gain amplifier associated with a negative feedback capacitive circuit.

The output signal of the generator 136 is applied simultaneously to a first input 137a of n analog gates 137 respectively associated with ozonization units 109-1 to 109-n shown in FIG. 12. A second input 137b of each of the gates 137 is respectively connected to one of the outputs of the circuit 135 for putting into sequence so that each is activated in turn and thus causes the synchronous mode of operation of the ozonization units 109-1 to 109-n. Each gate 137 is also connected by a third input 137c to the respective line 117 for opening a given gate 137 only when the corresponding ozonization unit 109-1 to 109-n must come into action. The outputs of the gates 137 are respectively connected to the inputs 127 of the converters 125 of the regulating loops 119 associated with the respective ozonization unit.

The circuit just described performs essentially two functions:

(a) the regulation of the width of the pulses 11, 12 . . . appearing at the terminals 126, which permits a regulation of the ozonization power;

(b) the control of the number of pulses and consequently of wave trains per unit of time, these pulses being distributed in accordance with a well-defined sequence to each of the ozonization units 109-1 to 109-n.

The signal which appears at the output of the amplifier 123 of each regulating loop 119 is an image of the ozonization power ensured by each unit 109-1 to 109-n and this signal is compared with a sawtooth delivered by the synchronization circuit 120 to the outputs of the gates 127. The detection of the start of the ramp and of the equality of the power signal with a point of the ramp permits converting the analog signal 118 of the amplifier 123 into a width of pulses, which operation is similar to that of a conventional analog-digital converter.

Consequently, the output signal appearing at the terminal 126 of each regulating loop 119 is a signal which is pulse width modulated so as to control it with the reference furnished by the source 122.

The synchronization circuit 120 controls the number of wave trains furnished to each ozonization unit 109-1 to 109-n by means of a signal which is the image of the totality of the ozonization power furnished by these units. This signal is obtained by the adder 132 and it is converted in the voltage/frequency converter 134 into a number of pulses per unit of time, each pulse expressing a fraction of the total power furnished for generating a sawtooth which is applied in succession to each of the regulating loops 119 after validation in the gates 137. Note that the number of pulses per unit of time thus expresses the amplitude of the total power furnished by the installation.

The variable resistor 133 regulates the gain of the circuit just described.

The signal from the converter 134 constitutes a variable time base whereby the operation of the ozonization units 109-1 to 109-n are put into sequence. The pulses of this signal also control the start and the end of the sawtooth produced in the sawtooth generator 136.

Two other functions concern on one hand the calculation of the number of alternations of rest between wave trains and on the other hand the determination of the times of rest between two successive controlled pulses initiating the wave trains.

Another secondary function resides in the control of the operation of the ozonization units upon the production of the synchronous initiation signal. This control is effected by a sensor placed in the immediate vicinity of each ionization units and providing a telemeasuring signal proportional both to the ozonization power and to the electromagnetic noise generated by the corona effect in the ozonizer. The detection of this noise is a proof of operation of the ozonization unit.

The microprocessor may be associated with an input/output interface circuit receiving the same signals as those applied to the servo system chain shown in FIG. 12. This circuit may be formed by an integrated circuit sold under the name MP20 by the Firm Burr Brown, while the microprocessor may be that commercially available under the reference 8008, 8080, 6800, Z80 or the like.

Having now described my invention what I claim as new and desire to secure by Letters Patent is:

1. In a method for supplying electric power to an ozone producing element comprising at least two conductive electrodes disposed in facing relation to each other and between which electrodes a gas to be ozonized flows, comprising the step of applying to said electrodes sequential bursts of electrical energy with a voltage whose amplitude value is capable of producing electronic discharges between electrodes with each burst comprising a wave train of alternating voltage, the bursts being separated from each other in time by time periods during which the volume of gas treated by a first burst will be at least partly evacuated from the space between the electrodes prior to the application of the second burst, and the step of providing to said electrodes an electrical condition during said time periods between bursts to cause gas ions resulting from the said first burst to remain between said electrodes.

2. The method according to claim 1 wherein said electrical condition applied to said electrodes during said time periods between bursts is a constant zero value voltage.

3. The method according to claim 1 wherein said electrical condition applied to said electrodes during said time periods between bursts is an alternating voltage having an amplitude insufficient to produce an electric discharge between said electrodes.

4. The method according to claim 3 wherein the amplitude of the alternating voltage is varied from an amplitude insufficient to produce said electric discharge during the time periods between bursts to an amplitude sufficient to produce electric discharge to thereby constitute said bursts.

5. A method for supplying electric power to a plurality of ozone producing elements from a common source of electrical energy, each ozone producing element comprising at least two conductive electrodes disposed in facing relation to each other and between which electrodes a gas to be ozonized flows, said method comprising the steps of generating wave trains of alternating voltage, generating initiating signals for selectively enabling the application of said wave trains to said ozone producing elements, controlling the duration of each of said initiating signals as a function of total ozonation produced by said ozone producing elements, so as to maintain production of ozone by each element as long as its associated initiating signal is active and synchronizing the generation of said successive initiating signals so as to supply solely one single ozone producing element at a time, with said wave trains.

6. A method according to claim 3, comprising modulating the amplitude of the alternating voltage during said time periods between burst so as to vary the voltage progressively on each side of a threshold voltage above which threshold voltage electronic discharges are produced in the ozone producing element and below which threshold voltage said discharges are absent.

7. A method according to claim 1 or 2, comprising producing the alternating voltage wave trains by means of a wave former whose operation is selectively initiated and interrupted in a periodic manner.

8. A method according to claims 3, 4 or 6, comprising producing the alternating voltage of variable amplitude by means of a wave former the direct supply voltage of which wave former is varied.

9. A method according to claim 7, comprising applying to said ozonizer wave trains of constant duration.

10. A method according to claim 9, comprising applying said wave trains of constant duration during consecutive base periods of equal durations and varying the number of wave trains applied during each base period as a function of the desired production of ozone.

11. A method according to claim 7, comprising applying said wave trains during consecutive base periods of equal durations and varying the duration of said wave trains applied during each base period as a function of the desired production of ozone.

12. A method according to claims 1, 2, 3, 4 or 5 wherein said alternating voltage has a frequency of about t 2,000 to 5,000 Hz.

* * * * *